Figure 1:
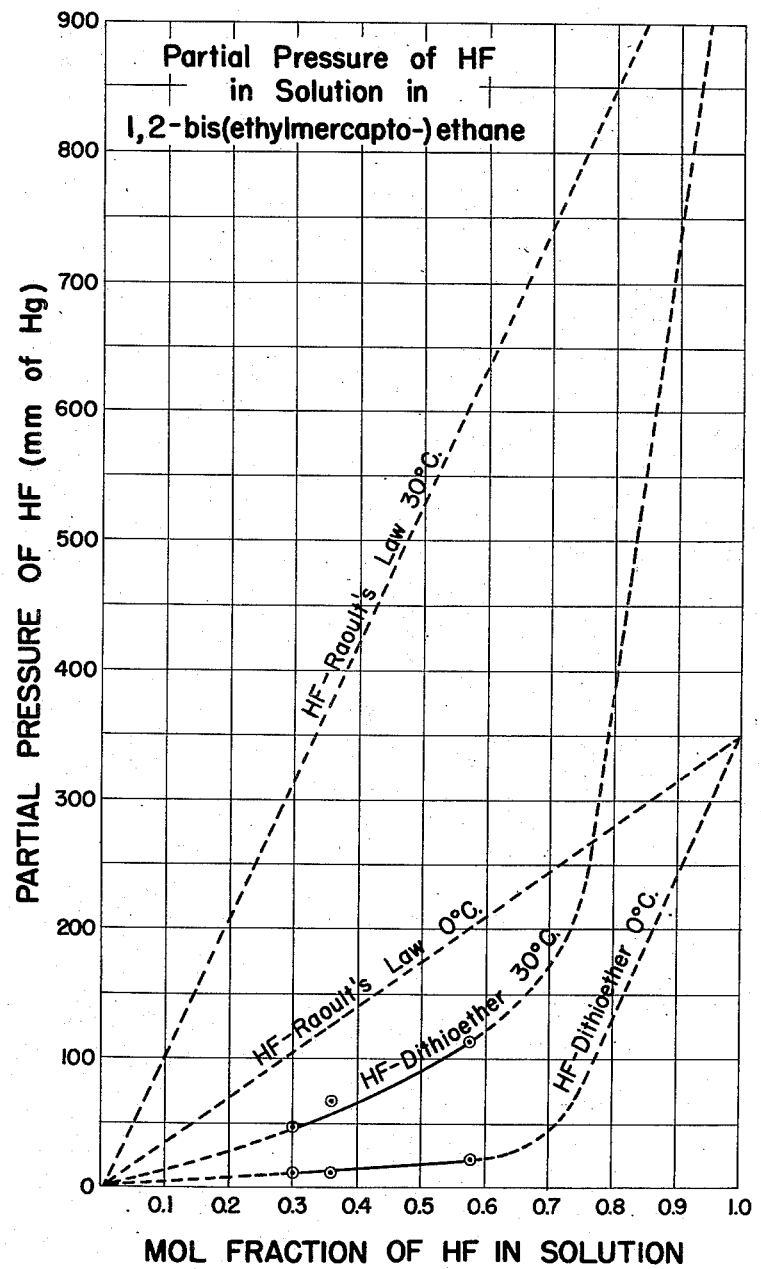

INVENTORS:
David A. McCaulay
Arthur P. Lien
By: Sam'l B. Becker
Attorney

Patented Jan. 9, 1951

2,537,076

UNITED STATES PATENT OFFICE 2,537,076

HYDROGEN FLUORIDE RECOVERY

David A. McCaulay, Chicago, Ill., and Arthur P. Lien, Hammond, Ind., assignors to Standard Oil Company, Chicago, Ill., a corporation of Indiana Application August 25, 1948, Serial No. 46,134

9 Claims. (Cl. 23—153)

This invention relates to a process for the recovery of hydrogen fluoride from gas or vapor streams containing the same. More particularly, this invention is concerned with novel absorbents for hydrogen fluoride comprising a vicinal dithioether.

Hydrogen fluoride is employed as a catalyst or a catalyst component in a variety of hydrocarbon reactions. For example, substantially anhydrous hydrogen fluoride can be employed as a catalyst for the cracking of hydrocarbon oils boiling above the gasoline boiling range to produce hydrocarbon gases, gasoline boiling range hydrocarbons and polyolefinic oils. It is necessary to recover the hydrogen fluoride which is present in the various cracking products; to this end hydrogen fluoride is usually distilled from the various reaction products, frequently with the aid of azeotrope-forming hydrocarbons such as propane or butanes, and is thus produced as a hydrogen fluoride-containing gas stream from which the hydrogen fluoride must be recovered to permit economical operation of the cracking process. Hydrogen fluoride employed as a catalyst or catalyst component in the alkylation of aromatic or isoparaffinic hydrocarbons with olefins or equivalent alkylating agents, in the isomerization of paraffinic or cycloparaffinic hydrocarbons, etc. is usually separated from the reaction products as a gas stream containing low boiling hydrocarbons.

Liquid hydrogen fluoride is employed as a solvent or solvent component in the refining of hydrocarbon oils, particularly for the desulfurization thereof. In the desulfurization of various petroleum oils by treatment with liquid hydrogen fluoride, for example about 20 to about 100 volume percent of liquid hydrogen fluoride, usually at temperatures between about 60° F. and about 300° F., a considerable proportion of sulfur compounds is extracted by the liquid hydrogen fluoride, but a variable proportion of the sulfur compounds originally present in the petroleum oil is converted to hydrogen sulfide, the specific proportion being dependent in a given case upon the specific sulfur compounds present in the oil, the treating temperature and the HF:oil ratio. The hydrogen sulfide stream thus produced may contain a considerable proportion of hydrogen fluoride which must be recovered therefrom.

Hydrogen fluoride-containing gaseous or vapor streams are also produced in various fluorination processes and it is economically and hygienically desirable to recover the hydrogen fluoride content of these streams.

One object of our invention is to provide novel and unexpectedly efficient absorbents for hydrogen fluoride. Another object of our invention is to provide absorbents and processes for the recovery of volatile inorganic fluorides such as hydrogen fluoride from gas or vapor streams. A more particular object of our invention is to provide absorbents and processes for the removal of hydrogen fluoride from petroleum refinery gas streams such as gas streams derived from isoparaffin-olefin alkylation operations, desulfurization operations, and the like, wherein hydrocarbons are contacted with hydrogen fluoride. Still another object of our invention is to provide the art with novel complex compounds of hydrogen fluoride and certain vicinal dithioethers. These and other objects of our invention will become apparent from the ensuing description thereof.

Briefly, we have discovered that certain vicinal dithioethers form stable complex compounds with volatile fluorides such as hydrogen fluoride and boron trifluoride and that these complex compounds can be thermally decomposed to regenerate the vicinal dithioether and said fluorides. The vicinal dithioethers are, therefore, available for use as absorbents for hydrogen fluoride and similar volatile inorganic fluorides from gas streams. The vicinal dithioethers available for use in accordance with this invention have the general formula

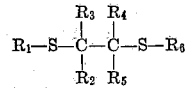

In the above formula $R_1$ and $R_6$ may be the same or different, although they are usually the same. $R_1$ and $R_6$ may also be part of a single structure for example a ring structure, as in compounds of the type of p-dithiane (1,4-dithiacyclohexane). In the above formula $R_1$ and $R_6$ are hydrocarbon radicals containing no aliphatic unsaturation and are joined to a sulfur atom through an aliphatic carbon atoms, i. e., a carbon atom which is not a nuclear carbon atom in an aromatic ring structure. Preferably $R_1$ and $R_6$ are alkyl groups, although one or both of these radicals may be cycloalkyl, alkylcycloalkyl, cycloalkylalkyl or aralkyl. As examples of $R_1$ and/or $R_6$ alkyl radicals, we may name methyl, ethyl, n-propyl, isopropyl, butyl, octyl, dodecyl, hexadecyl and the like. Examples of $R_1$ and/or $R_6$ cycloalkyl radicals are cyclohexyl and cyclopentyl. Examples of $R_1$ and/or $R_6$ alkylcycloalkyl radicals are methylcyclohexyl, methylcyclopentyl, ethylcyclopentyl and the like. Examples of cycloalkylalkyl $R_1$ and/or $R_6$ radicals include cyclopentylmethyl, cyclohexylmethyl and cyclohexylisobutyl. Suitable examples of $R_1$ and/or $R_6$ aralkyl radicals include benzyl and naphthomethyl.

The $R_2$, $R_3$, $R_4$ and $R_5$ radicals may be the same or different and are hydrogen or a hydrocarbon radical containing no aliphatic unsaturation, for example alkyl, cycloalkyl, aryl radicals or hydrocarbon substitution derivatives thereof. Preferably, the members of the $R_2$ to $R_5$ radicals, inclusive, are selected from the class consisting of hydrogen and alkyl radicals.

The term "aliphatic unsaturation" as employed herein and in the appended claims is intended to define a double or triple valence linkage between carbon atoms in a chain or in a cycloaliphatic ring and does not extend to aromatic unsaturation, i. e., triply conjugated double bonds in a 6 carbon atom ring structure.

Specifically, suitable vicinal dithioethers for employment in the process of our invention are alpha, delta-dithiaparaffins (re nomenclature, note J. S. Ball and W. E. Haines, Chem. Eng. News 24, 2465–9 (October 25, 1946)), such as 3,6-dithiaoctane (1,2-bis (ethylmercapto-)ethane), 2,5-dithiahexane (1,2-bis (methylmercapto-) ethane), 4-methyl-3,6-dithiaoctane, 10,10-dimethyl-9,12-dithia-eicosane, 4,4-dimethyl-3,6-dithiaoctane, 1,6-diphenyl-2,5-dithiahexane, 4,5-dimethyl-3,6-dithiaoctane, 1,4-dicyclohexyl-1,4-dithiabutane and the like. It will readily be understood that we may employ one or a mixture of several vicinal dithioethers for the absorption and recovery of hydrogen fluoride and the like from gaseous or vapor streams containing the same, although for reasons of economy and simplicity it is generally preferred to employ one vicinal dithioether in the process of our invention.

Although there are a considerable number of vicinal dithioethers which are liquid under the conditions employed in the process of our invention, our invention may be practiced with vicinal dithioethers which are normally solid under the process conditions of our invention in which case the vicinal dithioethers may be dissolved in suitable solvents such as certain hydrocarbons, halogenated hydrocarbon solvents, particularly certain fluorine-containing solvents and the like.

The gaseous or vapor streams to be treated in accordance with the process of this invention may contain hydrogen fluoride in variable proportions, usually at least about one volume percent. The gaseous or vapor streams to be treated in accordance with this invention may also contain volatile inorganic fluorides in addition to or in lieu of hydrogen fluoride, particularly boron fluoride. Usually the gas stream to be treated is contacted with a liquid comprising a vicinal dithioether as defined above, employing processing equipment which will afford suitable gas-liquid contact, at temperatures between about 0° F. and about 100° F., preferably about 30° F. to about 80° F., at atmospheric or higher pressures, for example, about 50 to about 250 p. s. i. g. The hydrogen fluoride in the gas stream, and also any $BF_3$ which may be present, reacts with the vicinal dithioether to produce a complex compound which contains 2 mols of HF (or $BF_3$) per mol of vicinal dithioether. It is not essential and, in fact, we prefer not to effect complete saturation of the vicinal dithioether with hydrogen fluoride. The vicinal dithioether-HF complex formed in the absorption operation is then subjected to thermal decomposition at elevated temperatures, usually at temperatures between about 150° F. and about 450° F. and preferably at about atmospheric pressure, although we may employ pressures somewhat above atmospheric, for example 50 p. s. i. g., or pressures below atmospheric to aid in separation of hydrogen fluoride vapor from the HF-vicinal dithioether complex. The hydrogen fluoride vapor produced in the complex decomposition operation is then subjected to cooling or to compression and cooling to produce liquid hydrogen fluoride which may be subjected to ulterior purification operations, if desired.

Figure 2:
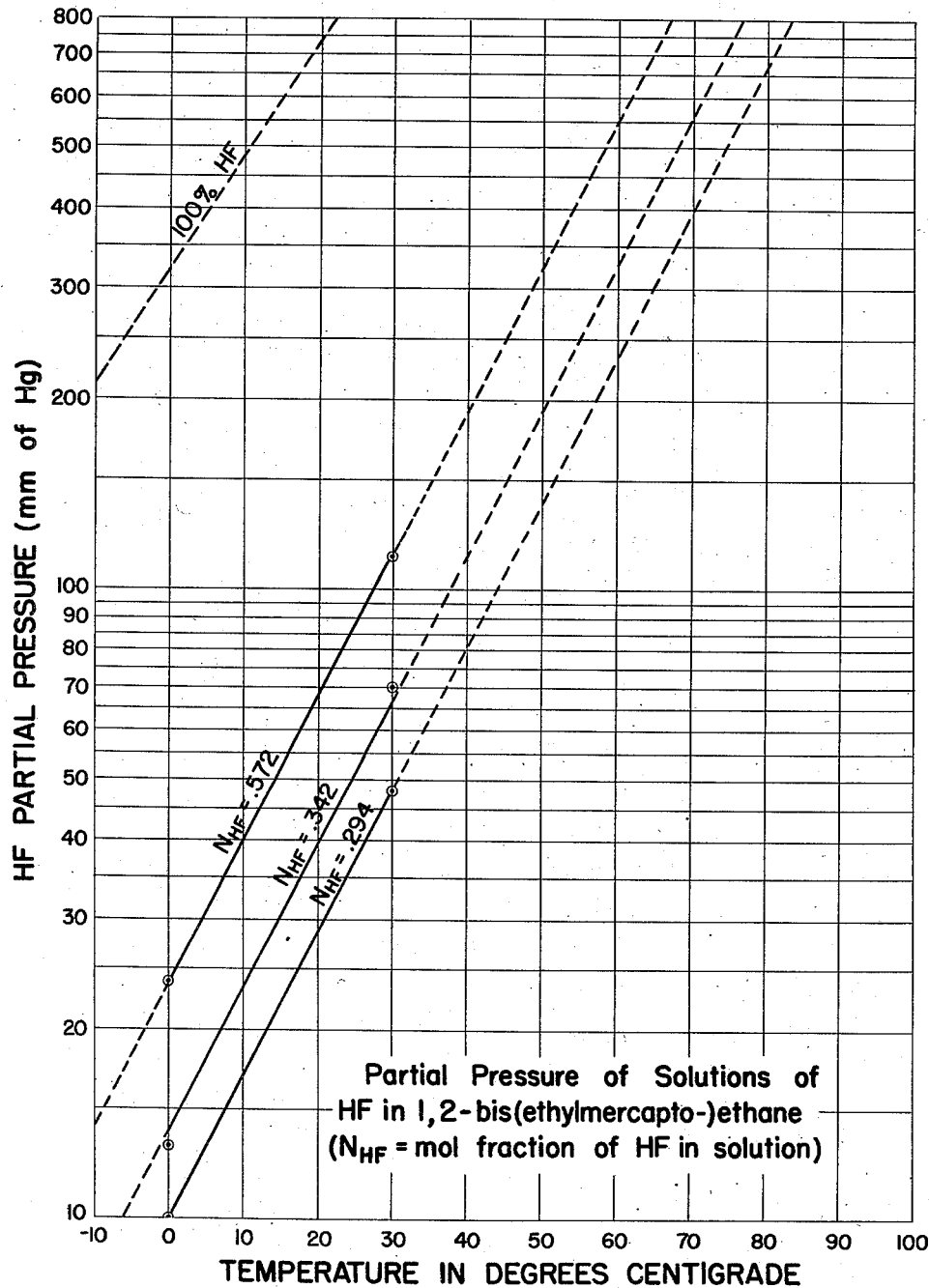

The results of vapor pressure measurements of a HF-vicinal dithioether (1,2-bis[ethylmercapto-]ethane) system are shown in Figures 1 and 2, wherein they are compared with the vapor pressure curve of hydrogen fluoride. Figure 1 is a graphical plot of the partial pressure of hydrogen fluoride at 0° C. and at 30° C. versus the mol fraction of hydrogen fluoride present in the HF-dithioether solution. In Figure 2, the partial pressure of three HF-dithioether solutions is plotted against temperature and a comparison curve is given of the vapor pressure of liquid hydrogen fluoride. The solubility curves in Figure 1 show a large negative deviation from Raoult's law, which indicates that hydrogen fluoride and the vicinal dithioether enter into chemical combination. The curves in Figure 2 show that the stability of the compound or complex of HF and vicinal dithioether decreases with increasing temperature.

It is known that thioethers having the formula $R'$—$S$—$R''$ wherein $R'$ may be either an alkyl or aryl radical and $R''$ may be an alkyl radical are absorbents for HF contained in gas streams. However, vicinal dithioethers of the type described and claimed herein are unexpectedly superior to mono-thioethers of the prior art as absorbents for hydrogen fluoride since they tend to retain HF far more tenaciously than the mono-thioethers, as evidenced by substantially lower partial pressures of hydrogen fluoride at equal molal concentrations at a given temperature. The dithioethers employed in the process of the present invention can be used to scrub hydrogen fluoride effectively from gas streams containing very low concentrations, for example about one volume percent of hydrogen fluoride whereas mono-thioethers of the prior art are relatively poor absorbents for the concentration of HF from such dilute mixtures with other gases.

Figure 3:
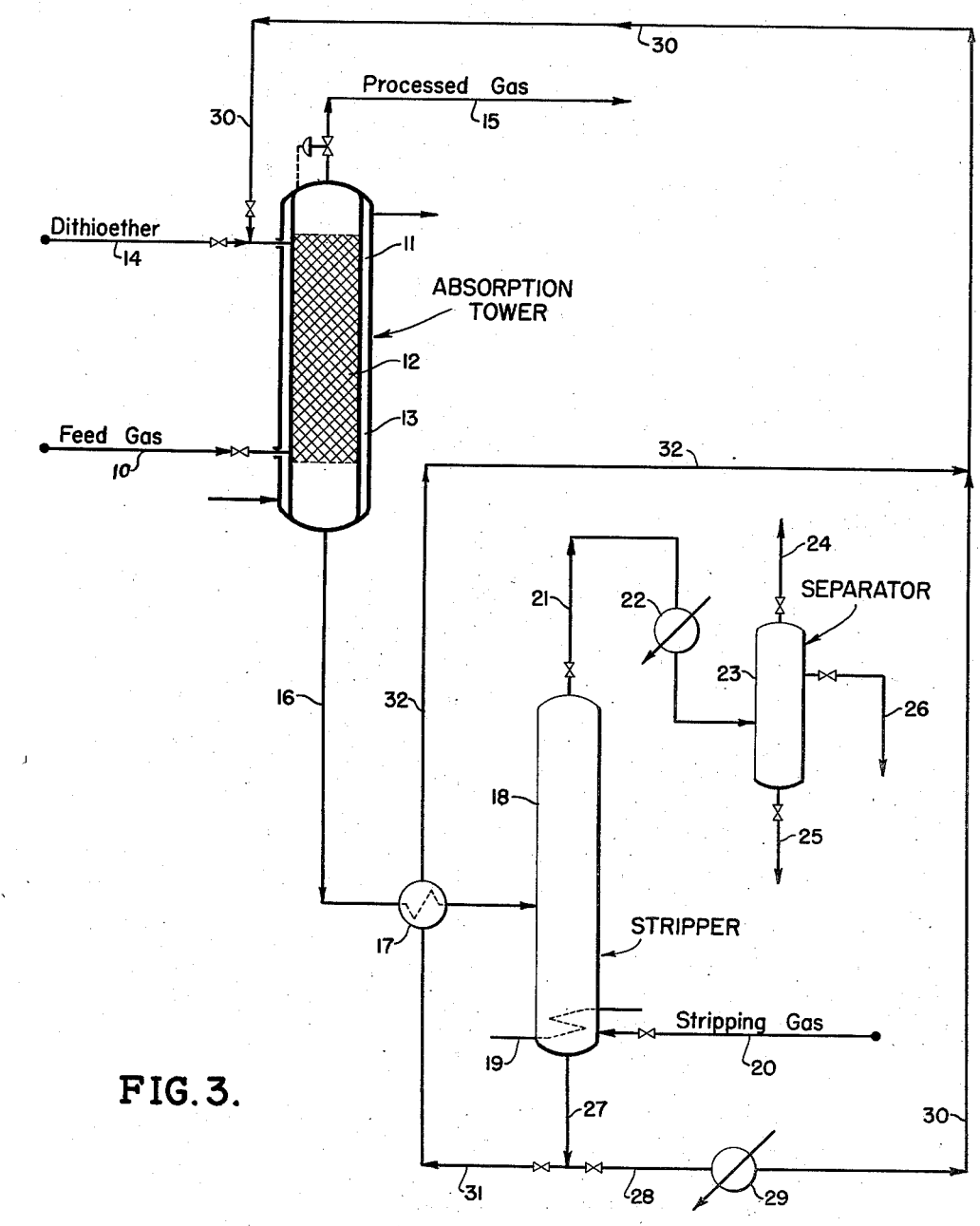

One method of carrying out the process of our invention is illustrated by the flow diagram of Figure 3. The feed gas may be a gaseous or vaporous mixture of hydrogen fluoride and low boiling hydrocarbon gases such as methane, ethane, propane, butanes, etc. and/or hydrogen sulfide containing at least about one volume percent of hydrogen fluoride, for example between about 10.0 and about 25.0 volume percent of hydrogen fluoride. The feed gas is passed through valved line 10 into the lower portion of an absorption zone, represented in Figure 3 as a tower 11 provided with packing material 12 which is resistant to the action of hydrogen fluoride and a cooling jacket 13 through which a cooling medium such as water may be circulated to remove the heat of absorption and to aid in maintaining the desired absorption temperature. A vicinal dithioether, for example, 1,2-bis (ethylmercapto-)ethane is charged to the upper portion of tower 11 through valved line 14 and flows downwardly through tower 11 in the liquid condition in countercurrent contact with the feed gas admitted through line 10.

The absorption operation in tower 11 may be suitably effected at a temperature between about 0° F. and about 100° F., preferably at temperatures between about 30° F. and about 80° F., and pressures between about 0 and about 250 p. s. i. g., preferably between about 0 and about 100 p. s. i. g. employing between about 0.5 and about 3.0 mols of dithioether per mol of inorganic fluoride contained in the feed gas.

Processed gas which has been partially or completely stripped of hydrogen fluoride passes overhead from tower 11 through valved line 15 and may be rejected from the system, recycled in part to line 10 or contacted with further quantities of a vicinal dithioether in a secondary absorption zone.

The absorption medium enriched in hydrogen fluoride is withdrawn from the lower portion of tower 11 through valved line 16, whence it is passed through heat exchanger 17 into a stripping tower 18 provided with a heating coil 19 in the lower portion thereof. Sufficient heat is imparted to the rich absorption medium to effect substantial thermal decomposition of the HF-vicinal dithioether complex in order that free hydrogen fluoride may be withdrawn therefrom. A temperature between about 150° F. and about 450° F., preferably between about 180° F. and about 350° F., is maintained in stripping tower 18. In order to favor the disengagement and removal of hydrogen fluoride from the rich absorption medium in tower 18 it is ordinarily desired to maintain a relatively low pressure therein, for example, pressures below about 50 p. s. i. g., usually atmospheric pressure, although even subatmospheric pressures may be employed. If desired, a readily condensable hydrocarbon gas such as propane, normal butane or isobutane may be introduced by valved line 20 into the lower portion of tower 18 to aid in stripping HF from the rich absorption medium.

A hydrogen fluoride-rich vapor stream passes overhead from tower 18 through valved line 21, thence through condenser 22 into an accumulating drum 23 provided with an overhead valved vent line 24 for the discharge of any non-condensable gas and a valved line 25 for the withdrawal of liquid hydrogen fluoride. When a readily condensable hydrocarbon stripping gas is injected into tower 18 it forms a supernatant liquid layer in accumulator drum 23, whence it may be withdrawn through valved side line 26, revaporized and employed in further stripping operations in tower 18.

The stripped or partially stripped absorption medium is withdrawn from the lower end of tower 18 through line 27 whence it may be passed through valved line 28, cooler 29 and line 30 for recycle to absorption tower 11 through line 14. Usually it is preferred to pass at least a portion of the hot stripped absorption medium through valved line 31 and heat exchanger 17, to impart a portion of its heat content to HF-rich absorption medium passing to stripping tower 18, thence through line 32 to line 30 for recycle to absorption tower 11.

Although the flow diagram of Figure 3 is descriptive of a continuous counterflow absorption process it should be understood that we are not limited to such an operation, but may use any suitable means for contacting the absorbent with the feed gas stream and for thermally decomposing the HF-vicinal dithioether complex which is comprised in the enriched absorption medium. It will be understood that absorption and stripping may be conducted on a batch or batch-continuous basis and that concurrent contacting may be employed in lieu of countercurrent contacting. Although we prefer to employ a liquid vicinal dithioether as the absorption medium, we may also employ solutions of solid vicinal dithioethers in suitable solvents or we may employ solid vicinal dithioethers as such or adsorbed or otherwise detained on solid supports which are resistant to the action of hydrogen fluoride, for example aluminum fluoride, copper, adsorbent carbon and the like. The solid adsorbent may be employed in counterflow operations as a moving bed of powder or pellets, as in the hypersorption process, or as a powdered fluidized mass.

Although the above description of our invention was concerned with the absorption of hydrogen fluoride from gaseous or vaporous mixtures containing the same, it will be apparent that it might be applied as a liquid extraction process for the extraction of hydrogen fluoride from solutions, the solvents of which are immiscible with a vicinal dithioether, for example a solution of hydrogen fluoride in fluorinated hydrocarbons.

Having thus described our invention, what we claim is:

1. A process for recovering hydrogen fluoride from a gaseous mixture containing the same, which process comprises contacting said mixture with a vicinal dithioether having the formula

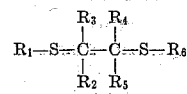

wherein $R_1$ and $R_6$ are hydrocarbon radicals containing no aliphatic unsaturation joined to a sulfur atom by an aliphatic carbon atom, and $R_2$ to $R_5$, inclusive, are selected from the class consisting of hydrogen and hydrocarbon radicals containing no aliphatic unsaturation.

2. A process for recovering hydrogen fluoride from a gaseous mixture containing the same, which process comprises contacting said mixture with a vicinal dithioether having the formula

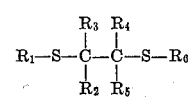

wherein $R_1$ and $R_6$ are alkyl radicals and $R_2$ to $R_5$, inclusive, are selected from the class consisting of hydrogen and hydrocarbon radicals containing no aliphatic unsaturation.

3. A process for recovering hydrogen fluoride from a gaseous mixture containing the same, which process comprises contacting said mixture with a vicinal dithioether having the formula

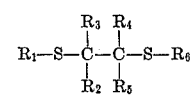

wherein $R_1$ and $R_6$ are alkyl radicals and $R_2$ to $R_5$, inclusive, are hydrogen.

4. A process for recovering hydrogen fluoride from a gaseous mixture containing the same, which process comprises contacting said mixture with a vicinal dithioether having the formula

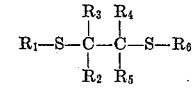

wherein $R_1$ and $R_6$ are alkyl radicals, and $R_2$ to $R_5$, inclusive, are hydrocarbon radicals.

5. A process for recovering hydrogen fluoride from a gaseous mixture containing the same, which process comprises contacting said mixture with 1,2-bis (ethylmercapto-)ethane.

6. A process for recovering hydrogen fluoride from a gaseous mixture containing the same, which process comprises contacting said mixture with a vicinal dithioether having the formula

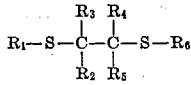

wherein $R_1$ and $R_6$ are hydrocarbon radicals containing no aliphatic unsaturation joined to the sulfur atom by an aliphatic carbon atom, and $R_2$ to $R_5$, inclusive, are selected from the class consisting of hydrogen and hydrocarbon radicals containing no aliphatic unsaturation at a temperature between about 0° F. and about 100° F.

7. A process for recovering hydrogen fluoride from a gaseous mixture containing the same, which process comprises contacting said mixture with a liquid comprising a vicinal dithioether having the formula

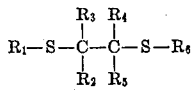

wherein $R_1$ and $R_6$ are hydrocarbon radicals containing no aliphatic unsaturation joined to the sulfur atom by an aliphatic carbon atom, and $R_2$ to $R_5$, inclusive, are selected from the class consisting of hydrogen and hydrocarbon radicals containing no aliphatic unsaturation at a temperature between about 30° F. and about 80° F.

8. A process for recovering hydrogen fluoride from a gaseous mixture containing the same, which process comprises contacting said mixture with a liquid comprising a vicinal dithioether having the formula

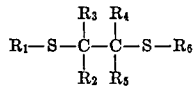

wherein $R_1$ and $R_6$ are alkyl radicals and $R_2$ to $R_5$, inclusive, are selected from the class consisting of hydrogen and hydrocarbon radicals containing no aliphatic unsaturation at a temperature between about 0° F. and about 100° F., and thereafter heating said liquid to a temperature between about 150° F. and about 450° F. to disengage hydrogen fluoride therefrom.

9. A process for recovering hydrogen fluoride from a gaseous mixture containing the same, which process comprises contacting said mixture with a liquid comprising 1,2-bis (ethylmercapto-)ethane at a temperature between about 30° F. and about 80° F., and thereafter heating said liquid to a temperature between about 180° F. and about 350° F. to disengage hydrogen fluoride therefrom.

DAVID A. McCAULAY.
ARTHUR P. LIEN.

REFERENCES CITED

The following references are of record in the file of this patent:

UNITED STATES PATENTS

| Number | Name | Date |
|---|---|---|
| 2,379,041 | Schulze et al. | June 26, 1945 |